United States Patent [19]

Trimble

[11] 4,086,684
[45] May 2, 1978

[54] SHIRRING MACHINE MANDREL

[75] Inventor: Roy Lane Trimble, Danville, Ill.

[73] Assignee: The Continental Group, Inc., New York, N.Y.

[21] Appl. No.: 729,562

[22] Filed: Oct. 4, 1976

[51] Int. Cl.² .............................................. A22C 11/02
[52] U.S. Cl. ............................................ 17/41; 17/35
[58] Field of Search ................... 17/41, 42, 34, 33, 35; 137/853

[56] References Cited

U.S. PATENT DOCUMENTS

| 1,484,741 | 2/1974 | Schonland, Jr. | 17/41 |
| 2,568,491 | 9/1951 | Edwards | 17/41 |
| 2,871,508 | 2/1959 | Hill | 17/41 |
| 2,902,049 | 9/1959 | Ilfrey et al. | 137/853 |
| 3,112,517 | 12/1963 | Ives | 17/42 |
| 3,158,896 | 12/1964 | Marbach | 17/42 |
| 3,416,567 | 12/1968 | Von Dardel et al. | 137/853 |
| 3,417,775 | 12/1968 | Smith | 137/853 |
| 3,462,794 | 8/1969 | Martinek | 17/42 |
| 3,473,190 | 10/1969 | Kielsmeier et al. | 17/41 |
| 3,594,857 | 7/1971 | Michl | 17/42 |

Primary Examiner—Russell R. Kinsey
Assistant Examiner—Paul J. Hirsch
Attorney, Agent, or Firm—Diller, Brown, Ramik & Wight

[57] ABSTRACT

An improved mandrel for use in a shirring machine, having two axially oriented substantially concentric fluid passageways formed therein equipped with two pairs of self-closing valves whereby two fluids may be separately introduced into the passageways for injection into the interior of casing material being shirred thereon. The valve pairs are adapted to be used alternately, whereby a strand of shirred casing may be passed along the entire length of the mandrel without interrupting the fluid flows.

15 Claims, 3 Drawing Figures

U.S. Patent May 2, 1978 4,086,684
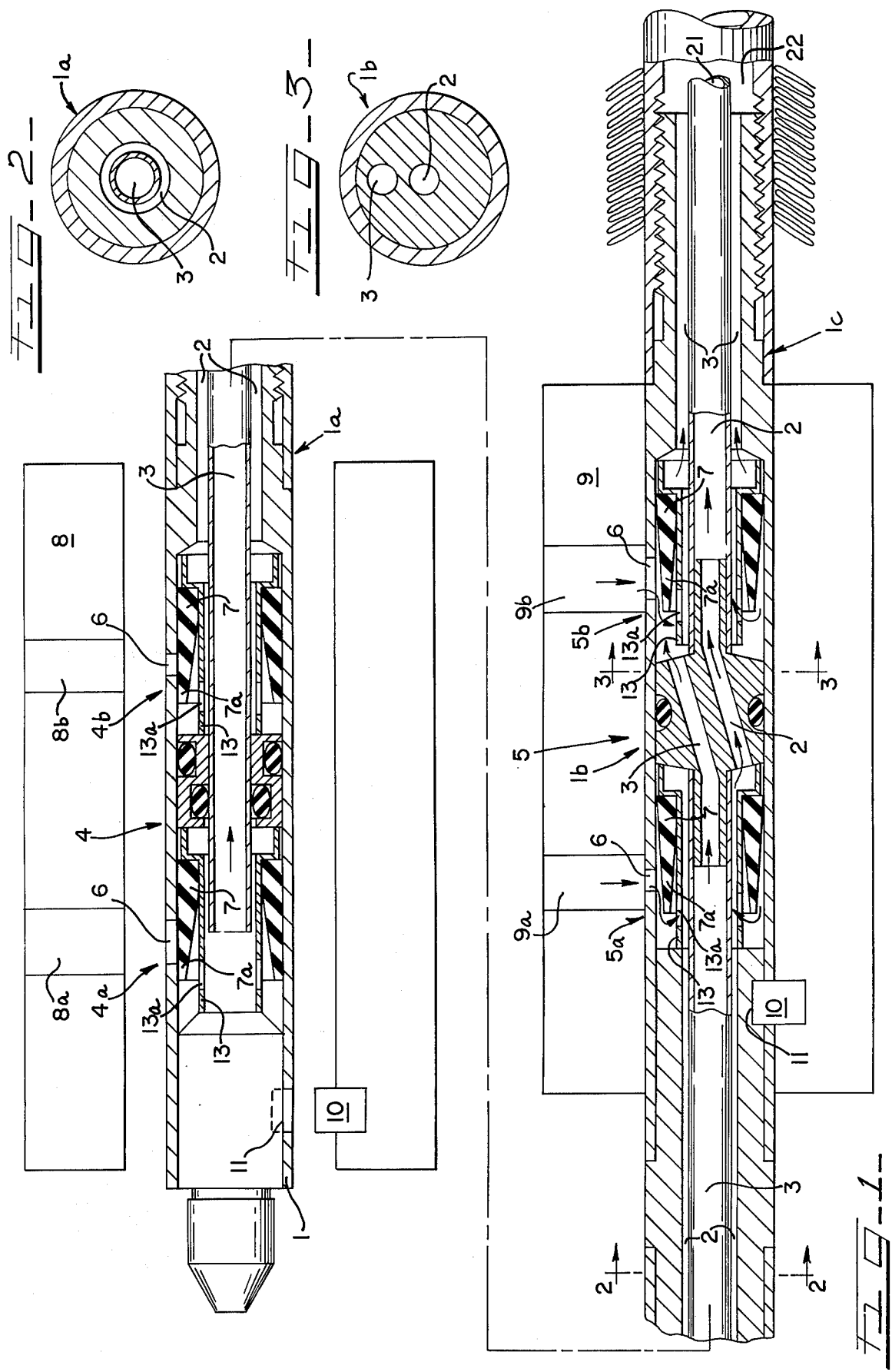

SHIRRING MACHINE MANDREL

SUMMARY OF THE INVENTION

The present invention relates, generally, to the shirring of thin walled tubular casings and the like and, more particularly, to an improved shirring mandrel.

It is well known in the art, as for example Ives U.S. Pat. No. 3,112,517, to introduce compressed air into the unshirred portion of the casing to inflate the same, whereby it may be more easily carried over the mandrel.

It has also been found that spraying the inner surface of the casing, immediately prior to shirring, with a humidifying agent, such as water, results in a shirred casing strand having superior mechanical properties.

Implemation of preshirring inflation and humidification has been hindered by the problems of providing for different flow rates for the air and water, and of maintaining uninterrupted fluid flows during doffing, when a severed strand of shirred casing is passed along the entire length of the shirring mandrel and transferred to a receiving mandrel.

It is therefore a primary object of the present invention to provide an improved shirring mandrel adapted for preshirring introduction of an inflating medium and a humidifying agent into the casing and more particularly, to introduce these fluids at different flow rates, and without interruption.

It is a further object to provide an improved shirring mandrel, adapted as described above, which may be employed with existing shirring machinery with a minimum of modification thereto.

With the above and other objects in view that will hereinafter appear, the nature of the invention will be more clearly understood by reference to the following description, the claims, and the several views illustrated in the accompanying drawings.

DESCRIPTION OF THE DRAWINGS

FIG. 1 is a longitudinal cross-sectional view of the improved shirring mandrel of the present invention.

FIG. 2 is a cross-sectional view taken substantially along line 2—2 of FIG. 1.

FIG. 3 is a cross-sectional view taken substantially along line 3—3 of FIG. 1.

DESCRIPTION OF THE PREFERRED EMBODIMENT

The mandrel of the present invention comprises a body 1, means for separately conveying two fluids through the body 1, and means for maintaining an uninterrupted flow of both of the fluids during passage of a portion of casing along the entire length of the body 1.

As shown in the drawings, the body 1 is a substantially cylindrical hollow member, having outer dimensions identical with those of conventional mandrel, and including first and second body portions 1a and 1c respectively, and a relatively short intermediate body portion 1b therebetween.

The fluid conveying means includes first and second fluid passageways 2 and 3 respectively, formed in the body 1. In the first and second body portions 1a and 1c, the passageways 2 and 3 are concentricly positioned, the first passageway 2 being outermost in the first body portion 1a, while the second passageway 3 is outermost in the second body portion 1c. In the intermediate body portion 1b, the passageways 2 and 3 are eccentric, serving to achieve the crossover between the innermost and outermost positions. Outlets 21 and 22, communicating with the first and second passageways 2 and 3 respectively, are formed in the downstream end of the body 1, and are configured to produce spray discharges on the interior surface of casing material being shirred on the mandrel.

The flow maintaining means includes first and second valve means 4 and 5 respectively, formed in the first and second body portions 1a and 1c, the first valve means 4 being located in the first body portion 1a, and the second valve means 5 straddling the intermediate body portion 1b. Each of the valve means 4 and 5 includes paired first and second self-closing valves 4a, 4b and 5a, 5b respectively, arranged such that one of each pair of valves communicates with the first passageway 2 and the other communicates with the second passageway 3. The valve means 4 and 5 are adapted for alternating flow as will be described hereinafter.

Each of the valves 4a, 4b, 5a and 5b comprises a port 6 formed in the body 1. The ports 6 are resiliently sealed by cylindrical, hollow, elastomeric flaps 7 concentric with the body 1. As best seen in FIG. 1, the flaps 7 include wall portions 7a, underlying the ports 6 which taper inwardly in the direction of flow through the passageways 2 and 3. The wall portions 7a are deflectable to nonsealing positions upon applications of external pressure thereagainst.

Mounted radially inwardly of the flaps 7 are rigid, cylindrical supports 13 which limit the deflection of the flap wall portions 7a and prevent eversion or dislodgment of the flaps 7. Support vents 13a are formed in the supports 13, radially inwardly and slightly axially offset from the ports 6 and provide for communication between the ports 6 and the passageways 2 and 3.

The mandrel is alternately supported by one of the openable upstream and downstream clamps 8 and 9 respectively. The clamps 8 and 9 are provided with fluid conduits 8a and 8b, 9a and 9b respectively for supplying fluids to the mandrel. Valve means (not shown) are included in the conduits 8a, 8b, 9a and 9b, whereby flow is permitted through a clamp which is gripping the mandrel, and ceases when the clamp opens.

In use, casing is shirred on the downstream end of the mandrel by means well known in the art. Initially, the upstream clamp 8 is closed about the mandrel, while the downstream clamp 9 is open (FIG. 1). After a suitable length of casing has been shirred on the mandrel, a predetermined length thereof is severed from the following casing. The severed strand is urged upstream along the mandrel, past the downstream clamp 9, to a position between the clamps 8 and 9. The upstream clamp 8 is now opened, while the downstream clamp 9 is closed. As the upstream clamp 8 opens, the flaps 7 of the valves 4a and 4b reassume their undeflected position sealing the ports 6 of the first valve means 4, while the closing of the downstream clamp 9 results in external fluid pressure being applied to the flaps 7 of valves 5a and 5b, causing a deflection thereof and permitting fluid to flow through the ports 6 of the second valve means 5. The severed strand may now be slid along the remaining length of the mandrel and removed at the upstream end thereof. It is to be noted that continuous fluid flow are maintained during this operation and that shirring is not interrupted.

Pins 10 are provided on the clamps 8 and 9 for mating with recesses 11 in the mandrel body 1. The mandrel is thus interlocked at all times with whichever of the clamps 8 and 9 is in the closed, supporting position, displacement of the mandrel thereby being prevented.

As is apparent from the drawings and the description, the formation of the passageways 2 and 3 and placement of the valve means 4 and 5 is accomplished by positioning a number of members in the interior of the hollow body 1 and sealing them thereagainst with conventional O-ring type seals.

While the preferred arrangement of the parts and method of application has been shown in illustrating the invention, it is to be clearly understood that various changes in details may be made without departing from the scope and spirit of the claims appeded thereto.

I claim:

1. An improved mandrel for use on a shirring machine, said mandrel being of the type for continuously introducing two different fluids into the interior of a casing material being shirred thereon, said mandrel comprising an axially elongated body member, passageway defining means within said body member defining first and second passageways arranged in concentric relation, first and second sets of inlets formed in said body member, said sets of inlets being spaced axially of said body member, each set of inlets including a first inlet and a second inlet in communication with a respective one of said first and second passageways, and pressure responsive valve means associated with each of said inlets restricting flow through each inlet to incoming flow whereby said first and second passageways may be supplied fluids selectively at one of two spaced points in accordance with the spacing of said sets of inlets.

2. The invention of claim 1, wherein said passageway defining means includes a first portion wherein said first passageway is radially outward of said second passageway and a second portion wherein said second passageway is radially outward of said first passageway, and said passageway defining means includes a cross-over portion.

3. The invention of claim 2, wherein in said cross-over portion said passageways are eccentric.

4. The invention of claim 1, wherein each said valve means includes a port and a flap resiliently sealing said port, said flap being deflectable to non-sealing position upon application of external pressure thereagainst.

5. The invention of claim 4, wherein said flap is in the form of an elastomeric member disposed concentric with said passageway defining means and radially inward of said port.

6. The invention of claim 5, wherein said flap includes a tapered wall portion, said wall portion tapering inwardly in the direction of flow through said first and second passageways.

7. The invention of claim 2, wherein said valve means of said first set of inlets are located in said first portion of said passageway defining means and said valve means of said second portion of said passageway defining means straddle said cross-over portion.

8. A mandrel for use in a continuous shirring operation, comprising an axially elongated body, means for separately conveying two fluids through said body, and axially spaced support surfaces on said body for engaging both a support member and a casing, and cooperating means in said support surfaces and within said body for maintaining an uninterrupted flow of both of said fluids during passage of a portion of a casing along the entire length of said body.

9. An improved mandrel having fluid supply means for introducing two fluids into the interior of a strand of casing material being shirred thereon, said mandrel having axially spaced support areas for engaging both a support member and a casing, and said fluid supply means including a set of inlets in each of said support areas whereby a strand of casing may be passed along the entire length of the mandrel without interrupting the fluid flows.

10. The invention of claim 9, wherein said fluid supply means comprises first and second passageways formed in the mandrel, and first and second valve means controlling fluid flow into said first and second passageways through each of said sets of inlets.

11. The invention of claim 10, wherein said first and second valve means are self-closing and openable in response to the application thereagainst of an external force.

12. The invention of claim 10, wherein said passageways are concentric for the major part of the length thereof.

13. An improved mandrel for use on a shirring machine, said mandrel being a floating mandrel being particularly constructed for continuously introducing two different fluids into the interior of a casing material being shirred thereon, said mandrel comprising an axially elongated body member, passageway defining means within said body member defining first and second passageways arranged in concentric relation, first and second sets of inlets formed in said body member, said sets of inlets being spaced axially of said body member, each set of inlets including a first inlet and a second inlet in communication with a respective one of said first and second passageways, and pressure responsive valve means associated with each of said inlets restricting flow through each inlet to incoming flow whereby said first and second passageways may be supplied fluids selectively at one of two spaced points in accordance with the spacing of said sets of inlets.

14. A mandrel for use in a continuous shirring operation, comprising a body, first and second fluid passages formed in said body, first and second spray means at an end of said body for introducing fluid from said passages into the interior of a tubular casing being shirred onto said mandrel, and first and second sets of first and second valve means operable for alternate connection of first and second sets of fluid supplies to said passages, said valve means being in spaced relation along the longitudinal axis of said body, whereby uninterrupted flows of fluids may be maintained through said passages during passage of a portion of a casing along the entire length of said body.

15. In a machine for shirring tubular casings having a hollow, cylindrical mandrel over which casing is to be telescoped,
fluid passage means within said mandrel including first and second fluid discharge means for separately discharging first and second fluids from a free end of the mandrel within casing telescoped thereon,
two sets of fluid inlet passages in the cylindrical wall of the mandrel, with the first set separated a predetermined axial distance from the second set,
means providing fluid connection to said first and second fluid discharge means respectively from one inlet passage of each of said sets of inlet passages, two sets of fluid source handling means, each set having means for applying and removing a respective set to said mandrel at the location of one said set of inlet passages, whereby when said respective set is removed casing material can move over said mandrel past the location of application of said respective set to the mandrel, and means within said mandrel responsive to a higher pressure of fluids at either set of inlet passages compared to fluid pressures at the other said set of inlet passages to cause the selective connection of the higher pressure set of inlet passages to said respective discharge means.

* * * * *